United States Patent
Dietrich et al.

(10) Patent No.: US 7,014,684 B2
(45) Date of Patent: Mar. 21, 2006

(54) METHOD FOR THE TREATMENT OF WASTE GAS FROM A CELLULOSE PLANT

(75) Inventors: Wolfgang Dietrich, Merseburg (DE); Hans Hiller, Starnberg (DE)

(73) Assignee: Linde Aktiengesellschaft, Wiesbaden (DE)

( * ) Notice: Subject to any disclaimer, the term of this patent is extended or adjusted under 35 U.S.C. 154(b) by 9 days.

(21) Appl. No.: 10/433,088

(22) PCT Filed: Nov. 30, 2001

(86) PCT No.: PCT/EP01/14009

§ 371 (c)(1),
(2), (4) Date: Nov. 25, 2003

(87) PCT Pub. No.: WO02/43838

PCT Pub. Date: Jun. 6, 2002

(65) Prior Publication Data

US 2005/0098037 A1    May 12, 2005

(30) Foreign Application Priority Data

| Dec. 1, 2000 | (DE) | 100 60 046 |
| Mar. 5, 2001 | (DE) | 101 10 464 |

(51) Int. Cl.
*B01D 53/78* (2006.01)

(52) U.S. Cl. .............. 95/199; 95/216; 95/223; 95/237; 162/29; 162/65; 162/67

(58) Field of Classification Search .............. 95/149, 95/187, 199, 216, 223, 224, 237; 96/275; 261/116, DIG. 54; 162/29, 65, 67
See application file for complete search history.

(56) References Cited

U.S. PATENT DOCUMENTS

| 3,544,086 A | 12/1970 | Willett |
| 3,764,464 A * | 10/1973 | Samuelson .................... 162/65 |
| 4,053,352 A * | 10/1977 | Hultman et al. .............. 162/29 |
| 4,619,813 A | 10/1986 | Healey et al. |
| 5,364,604 A * | 11/1994 | Spink et al. ................. 423/210 |
| 5,944,951 A | 8/1999 | Minami |
| 6,004,364 A * | 12/1999 | Ekholm et al. ............ 623/23.7 |
| 6,315,861 B1 * | 11/2001 | Joseph et al. .................. 162/15 |

FOREIGN PATENT DOCUMENTS

| DE | 1967738 | 4/1965 |
| DE | 7406735 | 12/1974 |
| WO | WO 93/18226 | * 9/1993 |

OTHER PUBLICATIONS

Soviet Inventions Illustrated, week 8447, Jan. 9, 1985, Derwent Publications, abstract of SU 1031473, Leningrad-Cell Paper INS, Jul. 30, 1983.
R.M.G. Boucher, L'Industie Chimique, Mar. 1952, pp. 71-77.
Database WPI, Week 198722, Derwent Publications, abstract of SU 1263736, Leningrad Forestry Acad., Oct. 15, 1986.
PCT Search Report for PCT/EP01/14009, 2002.

* cited by examiner

*Primary Examiner*—Frank M. Lawrence
(74) *Attorney, Agent, or Firm*—Millen, White, Zelano & Branigan, P.C.

(57) ABSTRACT

A process and a device for cleaning waste gas from pulp production, especially for cleaning waste gases from a bleaching reactor. Aerosols contained in the waste gas are removed and the gaseous impurities are scrubbed out of the waste gas by a scrubbing liquid.

21 Claims, 1 Drawing Sheet

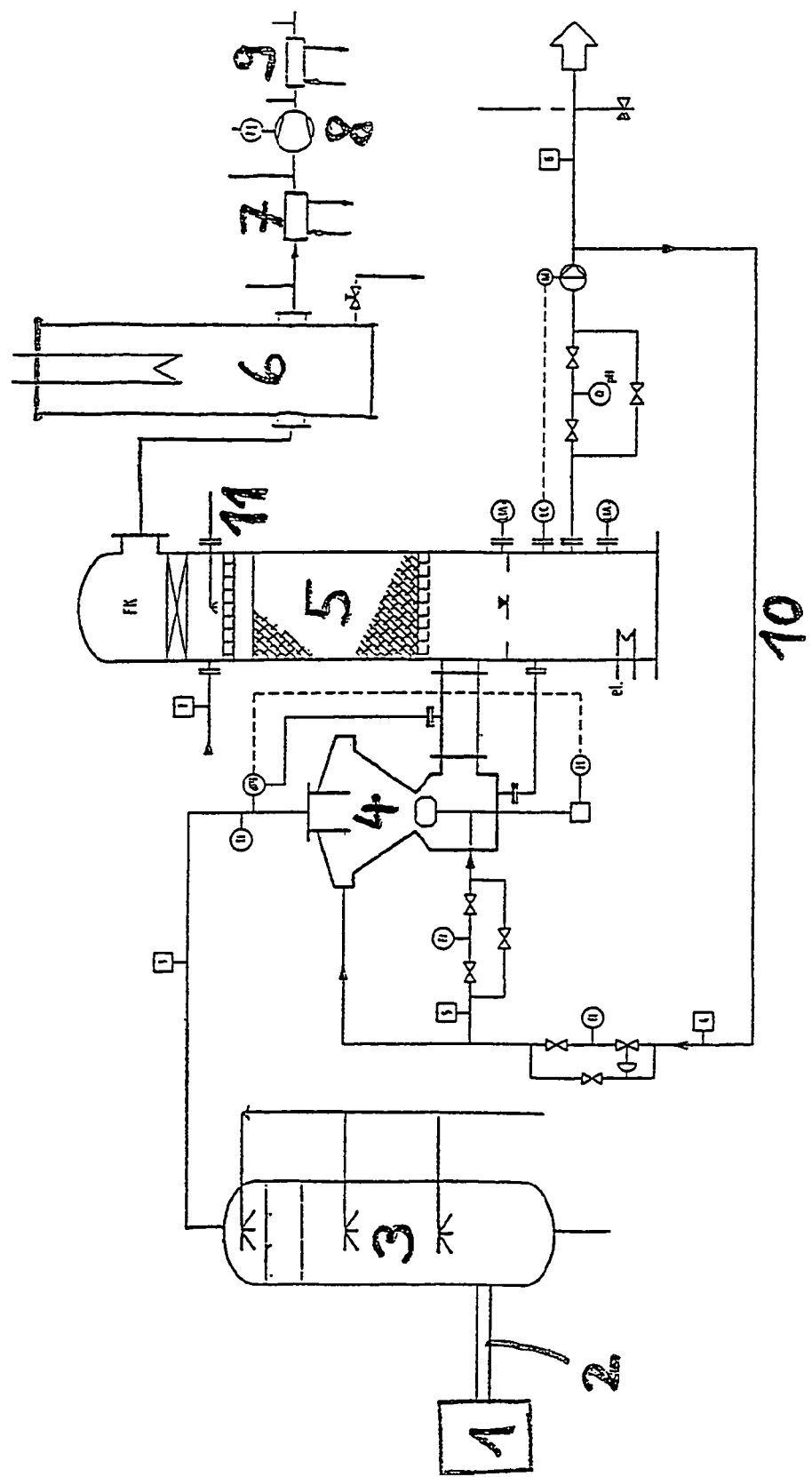

METHOD FOR THE TREATMENT OF WASTE GAS FROM A CELLULOSE PLANT

The invention relates to a process for cleaning waste gas from pulp production and a device for bleaching pulp in a bleaching reactor.

Based on the increased requirements of environmental protection, the pulp and paper industry has moved to using ozone or a gas mixture of oxygen and ozone as the bleaching agent instead of chlorine.

Here, oxygen is supplied to an ozone generator, in which the oxygen is partially converted into ozone. The resulting oxygen-ozone mixture is then supplied in the required amount and concentration to the so-called Z-stage of pulp production in which the pulp is bleached by ozone.

In the reaction of the pulp with the oxygen-ozone mixture, reaction gases form that are removed jointly with the residual ozone from the Z-stage and are routed via a so-called fiber scrubber in which entrained pulp fibers are removed from the gas flow. The gas flow is then supplied to an ozone destruction system in which the residual ozone is converted into oxygen.

During operation of these systems, it has been ascertained that corrosion occurs on numerous system and equipment parts that come into contact with the waste gas, and on the pipelines between the Z-stage and the ozone destruction system. The corrosion is especially serious when the pulp is treated not only with ozone, but with mixtures of bleaching agents, for example ozone and chlorine dioxide, or even in succession with different bleaching agents. In mixed operations and in all transition states between defined operations of the bleaching stage, additional aggressive substances that cause corrosion have been found in the gas flow that has been withdrawn from the bleaching stage.

The object of this invention is therefore to develop a process and a device for cleaning waste gas from pulp production or for bleaching of pulp, corrosive damage on the system parts that come into contact with the waste gas being avoided.

This object is achieved by a process of the initially mentioned type, aerosols located in the waste gas being removed and gaseous impurities being scrubbed out of the waste gas by means of a scrubbing liquid.

The device according to the invention for pulp bleaching in a bleaching reactor is characterized in that the bleaching reactor is connected via a waste gas line to a device for removing aerosols from a gas flow and a scrubbing column for removing gaseous impurities from a gas flow.

In extensive research preceding the invention, it was found that in the reaction of pulp with a bleaching agent, especially with ozone, reaction gases of a special type are formed. The composition of these reaction gases that are formed in pulp production or processing under the most varied process conditions and that must be discharged as waste gases has been thoroughly analyzed.

Based on this research, it was recognized that in the bleaching reactor in the reaction of the pulp with the bleaching agent, aerosols form in which various acids are bonded. Other aggressive components were ascertained as gaseous traces in the waste gas.

This mixture of the most varied acids and other corrosive materials is continuously removed with the waste gas from the pulp production section, then attacks the system components that come into contact with the waste gas, and leads to corrosive damage. In the known systems, in the past only a fiber scrubber was used for waste gas cleaning. The latter was able to scrub pulp fibers out of the waste gas, but aggressive substances remain in the waste gas or can only be inadequately removed from it.

The invention now makes available a cleaning process tailored to the waste gases that are formed in the paper and pulp industry, in which the acid-laden aerosols are removed from the waste gases and the gaseous impurities are scrubbed out of the waste gas by means of a scrubbing liquid. The invention is of great importance especially in the production of pulp using HC technology with ozone.

The aerosols are removed preferably with a Venturi scrubber. The aerosol-laden waste gas is delivered into a Venturi scrubber and brought into contact with a scrubbing water flow that compared to the waste gas stream has a high relative speed. Due to their inertia, the aerosols in the waste gas strike the droplets of scrubbing water, settle on them and are thus scrubbed out of the waste gas. Under certain circumstances, it can also be quite advantageous to use a rotary scrubber instead of the Venturi scrubber. Furthermore, to remove aerosols, fabric filters, electric filters and binary-jet systems have proven favorable.

Preferably the Venturi scrubber is equipped with an adjustable nozzle cross-section. By changing the nozzle cross-section at a constant amount of waste gas, the degree of separation, i.e., the cleaning action, can be changed. Conversely, when the amounts of waste gas fluctuate, the degree of separation can be kept constant by adapting the nozzle cross-section. The invention thus always allows a constant cleaning action even when the load of the pulp production system changes.

The gaseous impurities in the waste gas flow are preferably scrubbed out in a scrubbing column in which the waste gas and a scrubbing liquid are routed in counterflow. It has been shown that a packed column is especially well suited to scrubbing chlorine and chlorine dioxide that contribute to the formation of the chloride that causes corrosion. The use of plate columns, packed columns or bubble columns, however, is also possible.

Preferably, the aerosols are removed from the waste gas upstream from the scrubbing column. First, therefore, the aerosols are removed from the waste gas flow, and then the gaseous impurities are scrubbed out in the scrubbing column. Solids in the waste gas, for example pulp fibers, are especially preferably removed from the waste gas before removing the aerosols. On the other hand, there is the danger that the device for removing the aerosols and the scrubbing column for removing the gaseous impurities will be clogged by pulp fibers and other particles.

The scrubbing liquid from the scrubbing column is also advantageously used as scrubbing water for the Venturi scrubber. In this case, a scrubbing liquid circuit is installed between the scrubbing column and the Venturi scrubber.

Since depending on the execution of the scrubbing column and the composition of the waste gas, in part also ozone is dissolved in the scrubbing liquid, the scrubbing liquid is routed via an ozone destruction unit, preferably via a catalytic ozone destruction unit, before it is removed.

By means of the invention, chemically aggressive substances are removed from the waste gas flow after passing through the Venturi scrubber or the device for removing aerosols, and the scrubbing column so that corrosion on the system parts downstream from the scrubbing column no longer occurs. In order to prevent corrosion in the waste gas cleaning part, i.e., in the scrubbing column and the device for removing aerosols, they are preferably made of a molybdenum-containing austenitic steel or a titanium alloy. These materials have proven relatively corrosion-resistant, mainly against chloride, in tests. In particular, the steels labelled with material number 1.4539 or 1.4529 according to the German Industrial Standard, and titanium alloys, especially titanium alloy 3.7235 according to DIN 17851, have proven especially effective.

The process according to the invention is especially suited for treatment of the reaction gases that form during bleaching of pulp and is used preferably when the pulp is being bleached with ozone and/or chlorine dioxide. Especially when bleaching with two different bleaching agents, whereby the bleaching agents can be used at the same time or else in succession, it has been found that the waste gas is mixed with especially aggressive substances. The invention can be used especially advantageously in these cases.

BRIEF DESCRIPTION OF DRAWING

The invention and other details of the invention are explained in more detail below using the embodiment shown in the drawings. Here, the single FIGURE shows the process diagram of a system according to the invention for cleaning waste gas from a bleaching reactor.

DETAILED DESCRIPTION OF DRAWING

In a pulp and paper mill, pulp is bleached in a bleaching reactor 1 with ozone and chlorine dioxide. In the chemical reactions that proceed in the bleaching reactor 1, numerous aggressive substances form. The acids that form in this process are bonded predominantly in aerosols that likewise form in the bleaching reactor 1. Other chemically aggressive substances, especially molecular chlorine and chlorine dioxide, are present in the gaseous phase.

The waste gases that form during bleaching are continuously suctioned off via a waste gas line 2 and are supplied to a fiber scrubber 3. In the fiber scrubber 3, pulp fibers that have been entrained with the waste gas flow are scrubbed out by the water flowing in the opposite direction. The aerosols located in the waste gas are conversely not scrubbed out in the fiber scrubber 3, but rather travel with the waste gas flow into the following system parts.

The waste gas from which the pulp fibers have been removed is then delivered to a Venturi scrubber 4 in which the aerosols contained in the waste gas are removed from the latter. In this process step, aggressive acids, such as HCl, $H_2SO_4$ and $HNO_3$, and other acids that are found in the waste gas bonded in the aerosols are removed from the waste gas flow. The Venturi scrubber 4 has an adjustable Venturi channel so that regardless of the amount of waste gas that forms, the desired degree of separation of aerosols from the waste gas flow can always be ensured. Depending on the pulp flow rate through the pulp production system and thus depending on the necessary flow rate of the bleaching agent through the bleaching reactor 1, optimum separation of the aerosols from the waste gas flow can always be set.

Then, the waste gas flow is supplied to a packed column 5 in which the gaseous impurities are scrubbed out in counterflow with the scrubbing liquid. The necessary amount of scrubbing liquid is supplied at the head of the column 5 via a liquid-gravity distributor in order to minimize entrainment of drops with the gas flow. The waste water that forms during scrubbing in the column 5 is withdrawn at the bottom of the column 5. When the gaseous impurities are being scrubbed out, in most cases also part of the ozone is dissolved in the scrubbing liquid. In some countries, for reasons of environmental protection, ozone is not allowed to escape into the atmosphere. For this reason, the scrubbing liquid, before it is drained, for example, into the sewer system, is routed via an ozone destruction unit that is not shown in the FIGURE in order to destroy the ozone dissolved in the scrubbing liquid.

The scrubbing water used in the packed column 5 is removed from the bottom of the column 5, in part routed via the line 10 to the Venturi scrubber, and used there as propellant water or scrubbing water in order to then be delivered again to the packed column 5.

In the scrubbing column 5, at least 97% of the chlorine and chlorine dioxide contained in the waste gas are scrubbed out. The other aggressive substances are essentially completely removed from the waste gas so that the waste gas is cleaned after passing through the Venturi scrubber 4 and the scrubbing column 5.

The scrubbed waste gas that always still contains most of the residual ozone originating from the bleaching reactor 1, but otherwise no longer contains chemically aggressive substances, is then supplied to a catalytic ozone destruction unit 6 that converts the residual ozone into oxygen.

The gas originating from the catalytic ozone destruction unit 6 is supplied via a cooler 7 to a negative pressure fan 8. The negative pressure fan 8, on the one hand, controls the negative pressure in the bleaching reactor 1, and on the other hand, it produces the overpressure that is necessary for the following system. Following the negative pressure fan 8, the waste gas is again run via a cooler 9 and is then to be compressed in an oxygen compressor that is not shown in the drawings to the final pressure necessary for the following process steps.

What is claimed is:

1. A process comprising: bleaching pulp with a bleaching gas comprising ozone; withdrawing a waste gas containing aerosols from said bleaching step; passing said waste gas through a Venturi scrubber operated with scrubbing water so as to scrub out the aerosols contained in the waste gas; and passing the waste gas to a different scrubbing step so as to scrub out gaseous impurities from the waste gas by means of a scrubbing liquid (5).

2. A process according to claim 1, wherein the nozzle cross section of the Venturi scrubber (4) is adjustable, and further comprising adjusting the nozzle cross section so as to match the amount of waste gas to be cleaned to the desired degree of cleaning.

3. A process according to claim 1, wherein in said different scrubbing step, the gaseous impurities are scrubbed out in a scrubbing column (5).

4. A process according to claim 1, wherein in said different scrubbing step, the gaseous impurities are scrubbed out in a packed column (5).

5. A process according to claim 1, further comprising withdrawing some of the scrubbing liquid (10) from said further scrubbing step and passing said scrubbing liquid as scrubbing water to the Venturi scrubber (4).

6. A process comprising: bleaching pulp with a bleaching gas comprising ozone and chlorine dioxide; withdrawing a waste gas containing aerosols from said bleaching step; passing said waste gas through a Venturi scrubber operated with scrubbing water so as to scrub out the aerosols contained in the waste gas; and passing the waste gas to a different scrubbing step so as to scrub out gaseous impurities from the waste gas by means of a scrubbing liquid (5).

7. A process according to claim 6, further comprising destroying the ozone in the resultant scrubbed waste gas.

8. A process according to claim 7, wherein the ozone is catalytically (6) destroyed.

9. A process according to claim 1, wherein pulp fibers in the waste gas are removed from the waste gas before the aerosols are removed.

10. A process according to claim 1, wherein first the aerosols in the waste gas are removed, and then the gaseous impurities are scrubbed out of the waste gas by means of a scrubbing liquid.

11. A process according to claim 2, further comprising withdrawing some of the scrubbing liquid (10) from said different scrubbing step and passing said scrubbing liquid as scrubbing water to the Venturi scrubber (4).

12. A process according to claim 3, further comprising withdrawing some of the scrubbing liquid (10) from said different scrubbing step and passing said scrubbing liquid as scrubbing water to the Venturi scrubber (4).

13. A process according to claim 4, further comprising withdrawing some of the scrubbing liquid (10) from said different scrubbing step and passing said scrubbing liquid as scrubbing water to the Venturi scrubber (4).

14. A process according to claim 10, further comprising withdrawing some of the scrubbing liquid (10) from said different scrubbing step and passing said scrubbing liquid as scrubbing water to the Venturi scrubber (4).

15. A process according to claim 10, wherein said further scrubbing step comprises scrubbing the gaseous impurities out in a scrubbing column (5).

16. A process according to claim 10, wherein in said different scrubbing step, the gaseous impurities are scrubbed out in a packed column (5).

17. A process according to claim 15, further comprising withdrawing some of the scrubbing liquid (10) from said different scrubbing step and passing said scrubbing liquid as scrubbing water to the Venturi scrubber (4).

18. A process according to claim 16, further comprising withdrawing some of the scrubbing liquid (10) from said different scrubbing step and passing said scrubbing liquid as scrubbing water to the Venturi scrubber (4).

19. A process according to claim 18, wherein the nozzle cross section of the Venturi scrubber (4) is adjustable and further comprising adjusting the nozzle cross section so as to match the amount of waste gas to be cleaned to the desired degree of cleaning.

20. A process according to claim 1, wherein the gaseous impurities scrubbed out from the waste gas include chlorine and/or chlorine dioxide.

21. A process according to claim 1, wherein the waste gas containing aerosols withdrawn from said bleaching step includes HCl, $H_2SO_4$ and/or $HNO_3$ acids bonded to the aerosols.

* * * * *